United States Patent
Esmiol

[19]

[11] Patent Number: 5,954,009
[45] Date of Patent: Sep. 21, 1999

[54] SHIP AND SUBMARINE WAKE ATTENULATION SYSTEM

[76] Inventor: Matthew A. Esmiol, P.O. Box 9457, Raymond, N.H. 03077-0957

[21] Appl. No.: 08/985,927

[22] Filed: Dec. 5, 1997

[51] Int. Cl.$^6$ ............................................. B63B 1/24
[52] U.S. Cl. ................................................. 114/274
[58] Field of Search ................... 114/67 R, 126, 114/274, 343, 312, 330, 332, 270; 244/1 N, 15, 3.24

[56] References Cited

U.S. PATENT DOCUMENTS

| | | | |
|---|---|---|---|
| 709,100 | 9/1902 | Leven | 114/14 |
| 980,964 | 1/1911 | Kalous . | |
| 1,377,222 | 5/1921 | Russell . | |
| 2,356,691 | 8/1944 | Peterson . | |
| 2,475,239 | 7/1949 | Hambrick . | |
| 2,649,266 | 8/1953 | Darrieus | 114/274 |
| 3,362,367 | 1/1968 | Rosefelder . | |
| 4,706,910 | 11/1987 | Walsh et al. . | |
| 5,088,433 | 2/1992 | Osawa . | |
| 5,186,117 | 2/1993 | Stallard, III . | |
| 5,222,455 | 6/1993 | Furey . | |
| 5,566,634 | 10/1996 | Petromanolakis . | |

FOREIGN PATENT DOCUMENTS 0230848  12/1985  Germany ............................. 114/67 R

*Primary Examiner*—Ed L. Swinehart
*Attorney, Agent, or Firm*—Vernon C. Maine; Scot J. Asmus

[57] ABSTRACT

A wake reflector system attached to the hull of a surface or subsurface vessel attenuates the visible surface elements of a vessel's displacement wake, making the vessel less likely to be detected by passive observation means from above. The system consists of plates firmly mounted parallel to the longitudinal axis of the hull over a sufficient length and at a sufficient distance outboard from the hull to contain and affect at least the bow component of the displacement wake. The system may incorporate non-reflective means to leak or pass a calibrated portion of the wake energy through the reflector system along its length. When the vessel moves forward, the displacement wake travels to the plate system and is contained and reflected back and forth between the plate system and the hull over the length of the system, substantially attenuating the peak amplitude, integrity and outward momentum of the remaining wake. The system is applicable to both surface vessels and submarines.

16 Claims, 8 Drawing Sheets

SHIP AND SUBMARINE WAKE ATTENUATION SYSTEM

BACKGROUND OF THE INVENTION

1. Technical Field of the Invention

This invention most generally relates to methods and apparatus for attenuating the visible wake of marine vehicles. More particularly, it relates to suppressing and attenuating components of the displacement wake of surface vessels and submarines in order to reduce the signature present in such wakes, as it may be observed by passive means from overhead.

2. Background of the Invention

When any solid object or vessel travels through or on the surface of a liquid it creates a disturbance as mechanical energy is transferred to the liquid by force and friction. The disturbance is called a wake and is comprised of two primary mechanical types, a displacement wake and a boundary layer wake. Displacement wakes are caused by the incompressible liquid being pushed out of the way at the bow of the vessel, called a compression wave, and falling back in at the stem, an expansion wave, as it travels through or on the liquid. A displacement wake created on or near the surface takes the physical form of a water wave. A displacement wake travels away from the vessel for great distances, until the mechanical potential energy stored in the waveform is dissipated by the friction in the liquid and in the case of a boundary surface or gas/liquid interface, the friction of the gas in combination with the liquid. In summary, the disturbance is called a wake and the physical form of the displacement wake is a water wave.

In the case of a submarine the displacement wake travels from the submerged vessel to the boundary surface and makes itself evident there just like the disturbance a submerged rock leaves in a swiftly traveling stream. The wake travels away from the point of disturbance until the energy in the wake is dissipated by the medium. This wave component of a vessel's wake can be quite visible from aircraft and space, and can readily lead the observer to determine the location and direction of travel of the vessel that produces the wake. Approximate speed and depth can also be determined.

A boundary layer or vorticity wake is caused when an object traveling through a liquid imparts a velocity to the liquid. The liquid moves in the same direction as the object, but ends up spinning in a vortex because of the different velocity profile imparted to the liquid. A boundary layer wake is not a wave but represents kinetic energy transferred to the liquid by giving the liquid a velocity as a result of the passage of the object. The boundary layer wake stays in place as a ship travels away from a reference point until the velocity imparted to the liquid diffuses. The boundary layer wake of a submarine will not diffuse to the surface unless the submarine is very close to the surface. Furey's U.S. Pat. No. 5,222,455 Ship Wake Vorticity Suppressor, Jun. 29, 1993, covers a method of minimizing the boundary layer wake, but does not address displacement wakes.

A propeller driving a ship or submarine also contributes to the wake created by the vessel. The rotation of the propeller in the liquid imparts a rotational velocity to the liquid. The propeller pushing the vessel through the liquid creates a compression and expansion wave. The rotational velocity imparted to the liquid by the propeller is very much like the boundary layer wake caused by the hull's surface as it travels through the liquid. The displacement wake from the propeller is reversed from the displacement wake created by the vessel. The expansion wake occurs on the forward side of the propeller. The compression wake forms on the rear side of the propeller as the propeller pushes the liquid to propel the vessel.

The energy in a wave created by the passage of a vessel can be attenuated by reflection of the wave to cause interference and scattering of the wave. A second method to attenuate the wave is passing the wave through wave guides that are sized or configured in relation to the wave size to attenuate or dissipate the wave rather than pass the wave efficiently as a wave guide would. The dissipation of the displacement wake is important because ship or submarine can be seen by normal vision, SER (Surface Effect Radar) and SAR (Synthetic Aperture Radar) of the opposing forces. Since the size of the vessel's wake is dependent on the speed the vessel is traveling, suppression or reduction by other means of a ship's or submarine's displacement wake allows a vessel to travel faster without exceeding the threshold level of disturbance that may be detectable by opposing forces.

Referring to FIG. 1, this diagram shows a top view of hull 10 of a typical surface vessel in forward motion through a liquid medium. Normal compression wave 11 and expansion wave 12 are being generated off the bow and stern respectively. Vorticity wake 13 trails off the stem. The three different wakes are clearly visible from above.

Referring to FIG. 2, incident wave 21 is directed towards surface 20 at angle 22 from normal, and results in reflected wave 23 being transmitted from surface 20 at angle 24 from normal. Angle 24 is equal to angle 22.

Referring to FIG. 3, wave 31 is shown to be summed with in-phase wave 32 of equal amplitude to produce wave 33 of double the amplitude. Wave 34 is 180 degree out of phase with wave 35, and when summed results in the canceling out of all amplitude.

Referring to FIG. 4, wave 41 is shown to be transmitted through wave guide 40 without any loss of amplitude, while wave 42 with a different frequency or wave length is unable to be transmitted through the same size wave guide with out a loss of amplitude. A wave guide will pass or channel a wave if the size of the wave guide is appropriate for the wave that is applied. If the wave guide is improperly sized for the wave then the wave will not pass through without a loss of aptitude or amplitude.

The prior art reveals vessels equipped with structures outboard of the hull, but previous patents use the structure to protect the ships from torpedoes and other threats to the ship. In two patents that claim to reduce the displacement wake of the ship, the process by which the displacement is reduced relates to affecting the laminar flow of water past the hull of the vessel.

Russell's U.S. Pat. No. 1,377,222, May 10, 1921, illustrates a structure external to the hull which would interfere with the otherwise normal distribution of wake, but which is intended to perform as a buffer for protection from impact or collision with terrain or external objects. There are two distinguishing features on the ship shown in the figures of the patent: item 2 the chambered buffer and item 13 the shields. The shields on the forward half of the ship would interfere with the bow wave, but the orientation of the rear shields would allow the wake to pass by with little interference. The boat's attachment shields are allowed to travel up and down without consideration of the wake.

Peterson's U.S. Pat. No. 2,356,691 Antitorpedo Shield, Aug. 22, 1944, discloses shields suspended external to the hull to block torpedoes. This specification does not anticipate or address the instant problem.

Hambrick's U.S. Pat. No. 2,475,239 Ship Protector, Jul. 5, 1949, discloses another variation on structures supported external of the hull for collision protection. This design would increase the wake turbulence of the ship.

Osawa's U.S. Pat. No. 5,088,433 Wave-Making Resistance Suppressing means in Ship, Feb. 18, 1992, reveals fins or deflectors attached to the forward end of the hull at the waterline, hinged at their front edge and adjustable to be angled outward at up to 25 degrees to affect the flow of water around the hull. This design would appear to increase the size of the displacement wake for vessels with any appreciable forward speed. Also, it does not affect the stern or propellor wakes.

Petromanolakis's U.S. Pat. No. 5,566,634 Ship's Stem Duct with Airfoil Section, Oct. 22, 1996, claims reduction of the propulsion wave height of the vessel by means of an airfoil shaped bow-mounted duct structure that imparts a further parting force to the water as the bow progresses. This disclosure does not address the stern displacement wake of the vessel or suppressing a major portion of the ship's total displacement wake. There is likewise no suggestion of application to submarines.

SUMMARY OF THE INVENTION

The invention, in its simplest form, is a wave reflector system attached to a surface ship or submarine, that reflects and reduces a vessel's displacement wake. It consists of a system of plates firmly mounted in parallel but at a sufficient distance from both sides of the hull to form a loose wave guide for the displacement wake. When the vessel moves forward, the water displaced by the hull forms the displacement wake. The displacement wake travels to the plate system and is then reflected back and forth between the plate system and the hull as the vessel moves forward; the integrity and outward momentum of the displacement wake being gradually reduced as it is channeled through the length of the reflector system. The wake in its now attenuated state is allowed to disperse in a random manner in the ocean astern of the vessel.

By attenuating the displacement wake of the vessel in this manner, the visible component of the vessel's overall wake will be less detectible by passive means from above. Reduction of displacement wave effects also decreases the wake erosion of inland or coastal waterways. Further, the alternation of displacement wakes may alter the acoustical characteristics of a vessel.

The wake reflections between the hull and the reflector system plates continues down the length of the hull and the plates as the vessel moves forward. With the plates set at a distance appropriate to size of the bow wave, reflected waves crisscross out of phase with each other, causing interference and attenuation of the wake generally. When the wake comes to the end of the reflector system it has been disassociated into many fragments traveling in many different directions. By perforating the plates or sloping the plates to allow the wave to partially spill over the upper edge, the wake energy can be further dissapated.

It is a goal of the invention to provide a wake reflector system for attenuating the displacement wake of ships and other marine vehicles, attachable or attached outboard of the hull and parallel to the primary direction of motion. In the case of surface vessels, the wake reflector system would have port and starboard plate systems.

It is another goal that the wake reflector system be set outboard a sufficient distance to accomodate the size of the wake, particularly the bow wave. To this end the system is suspended at a distance from the widest point of the hull of at least twice the width of the bow wave created when a surface vessel is at maximum normal speed and full displacement, and the plates of the system extend at least vertically upward from the level of the water line or surface and longitudinally from the point sufficiently forward to catch the bow wave cascading off the bow to even or just aft of the widest point of the hull.

It is another goal to have a wake reflector system that affects all components of the wake. To this end the system may extend aft to beyond the stern of the vessel, sufficiently far to catch the surfacing propulsion wake. Likewise, the plates of the system may extend vertically from the hull's keel depth to the top of the freeboard height.

It is still another goal of the invention that a wake reflector system have non-reflecting means of affecting a disappation or attenuation of the visible wake. To this end, the upper edges of the plate systems may be set at a greater distance outboard of the hull than the lower edges, placing the plates in an outwardly sloping attitude that provides for an upwardly deflecting force or spilling of a portion of the wake over the top of the plate system. Further, wake reflector systems may be constructed of multiple plates arranged in spaced plate arrays or having regular or irregulary perforations that provide a calibrated leak to allow a portion of the wake energy to pass through the reflector system in a distributed fashion.

It is a yet further goal to provide means for fragmenting the reflections of a wake reflector system into components of different phases, thereby reducing the peak amplitude of the wake. To this end the plate systems may have plate arrays with adjacent plates arranged in alternate planes set at somewhat different distances from the hull, so that the wake is broken up into multiple components traveling different distances and therefore being at different relative phases.

It is an additional goal of the invention to provide a wake reflector system for submarines and other submergible vessels, with a plate system suspended outboard of the hull and parallel to the direction of motion. The system may extend longitudinally from near enough to the bow to catch the bow wave, to at least even with the widest point of the hull, and may generally conform to and encircle at least the upper half of the cross section shape of the hull so as to affect at least the upper half of the bow wave which would normally be transmitted to the surface. With the further goal of affecting all components of the wake, it may be extended further aft to at least the stern.

It is another additional goal to affect the bottom side components of a submarine wake which might otherwise be reflected off the floor of relatively shallow bodies of water, and hence to the surface. To this end, the wake reflector system may encircle the hull in the form of a tube with open fore and aft ends.

Further goals and objectives will be apparent from the figures, further description and claims of the invention.

DESCRIPTION OF THE PREFERRED EMBODIMENT

Water being relatively incompressible compared to the atmosphere, the energy of displacement of a surface marine vehicle is imparted into the water first as a bow displacement wake. It can be seen that the energy or size of the bow wave W is mainly a function of the volume V and rate of displacement of water:

$$W = V \cdot dv/dt$$

A large amount of water moved aside at a high rate will generate a large wall or wave of water that rolls outward, and continues away from the hull at a known speed, because wave speed depends on the elasticity of the medium and on its inertia, until dissipated.

At the stern of the vehicle, a subsequent displacement wake occurs to full the void left by the moving vehicle. It can be thought of as an expansion wake. It differs significantly from the bow wake in that the port and starboard reaction waves converge behind the vehicle, the opposite and equal amounts of kinetic energy effectively canceling each other.

While the size of a bow wave can be computed from the engineering and design data, an alternative method is simply to move the subject hull, or a substantially identical full size or scale model hull, with full displacement at maximum cruise speed through the water, and record the size of the bow wave at and near the hull.

The following is a description of a preferred embodiment of the invention, presented as illustrative but not restrictive of the scope of the invention.

Figure 1:
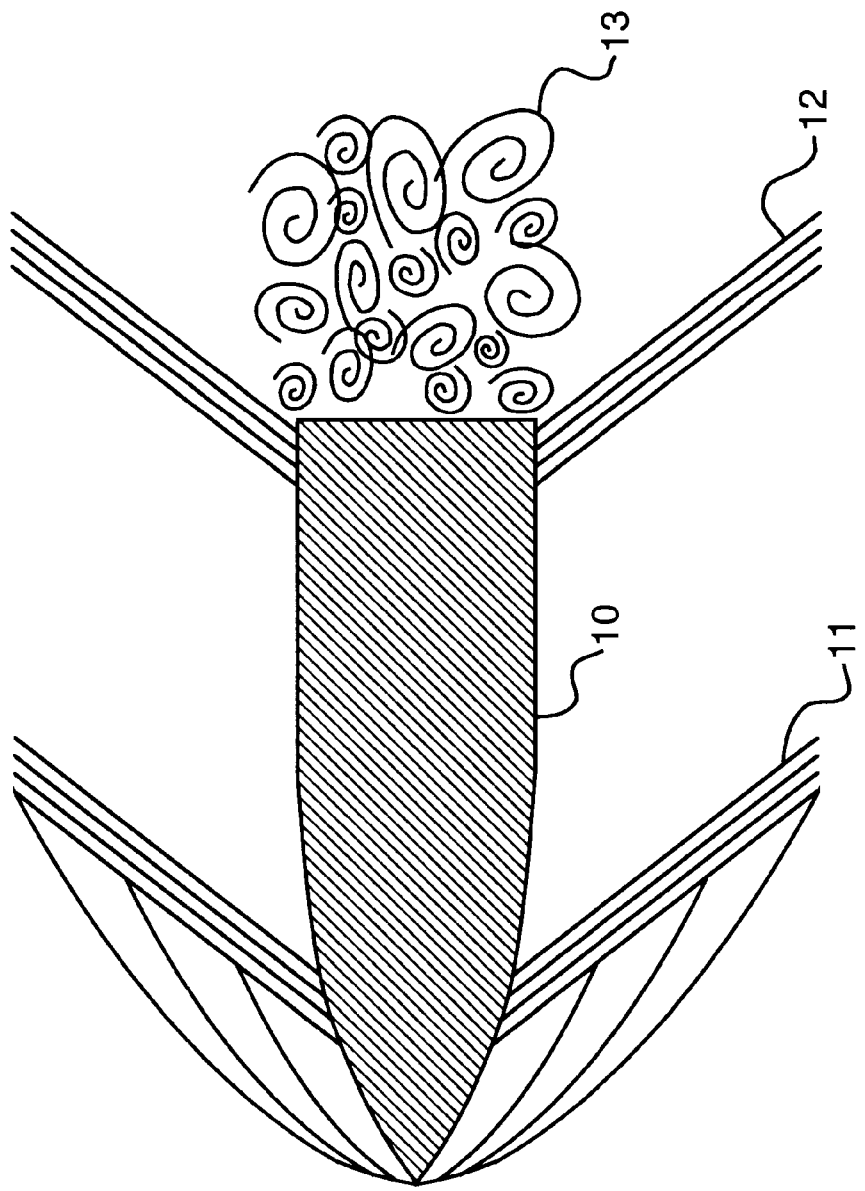
FIG. 1 is a diagrammatic illustration of a surface vessel traveling on a liquid medium, producing a compression wake from the bow, an expansion wake at the stem, and a vorticity wake behind the vessel.
Figure 2:
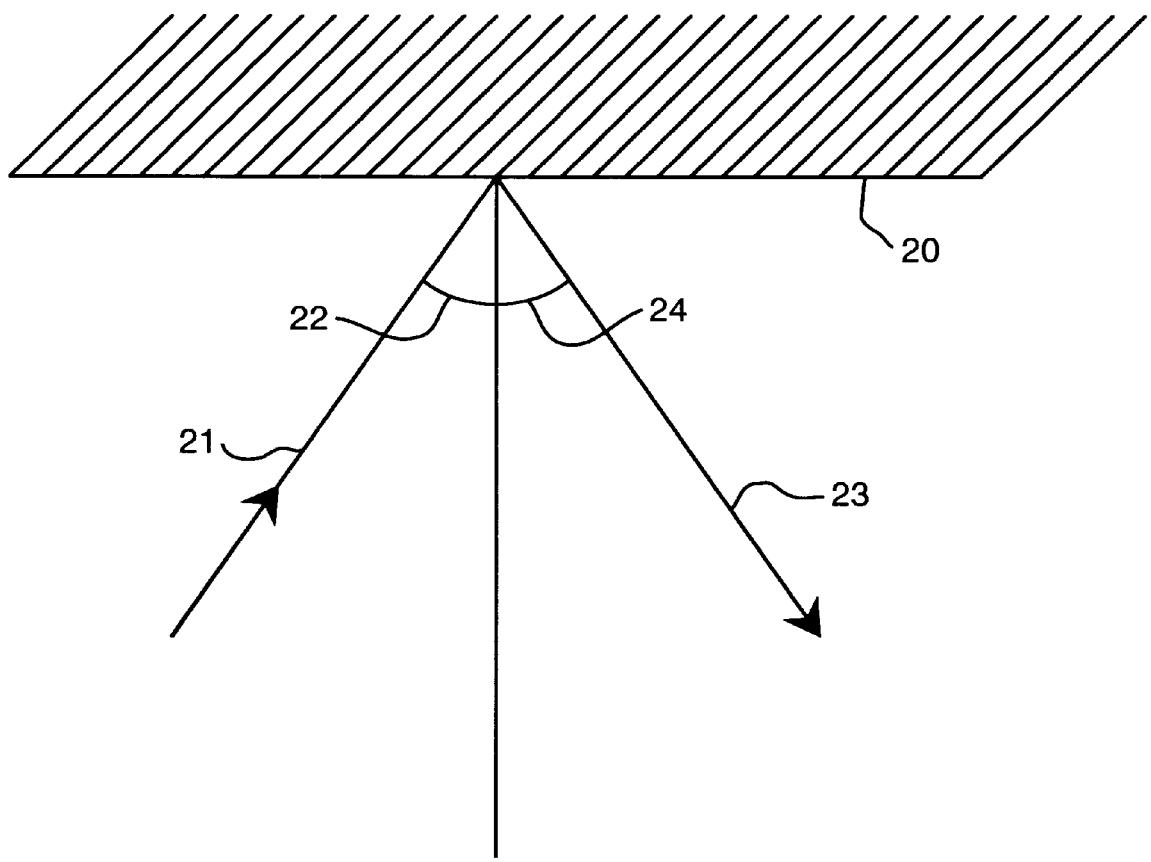
FIG. 2 is a diagrammatic explanation of wave reflection showing the angle of the incident wave to be equal to the angle of the reflected wave.
Figure 3:
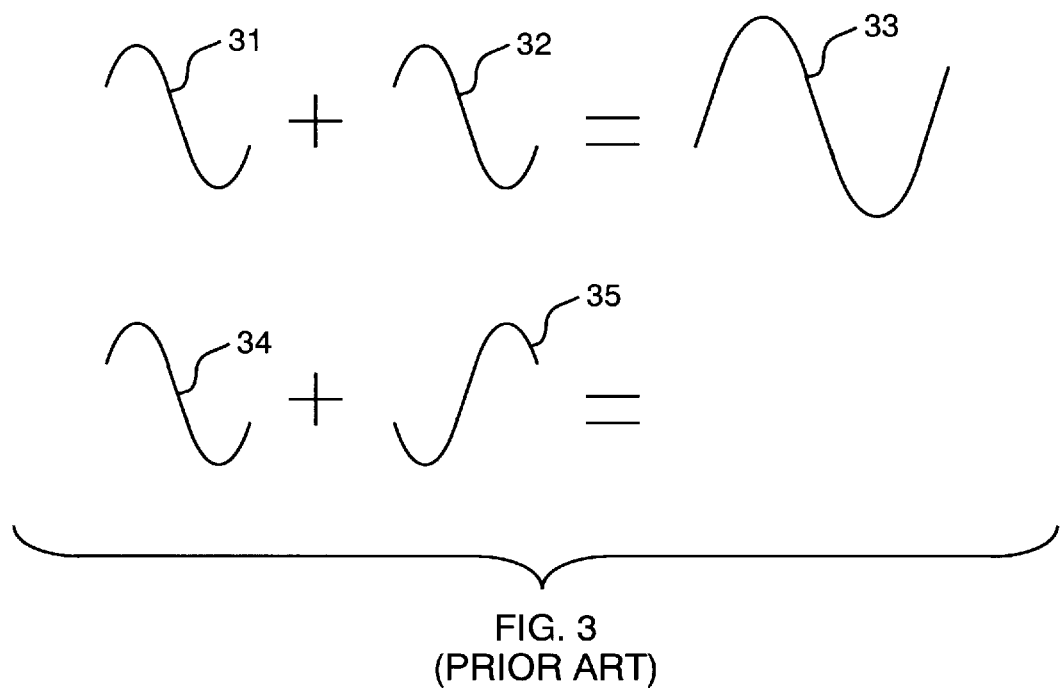
FIG. 3 is a diagrammatic illustration of the summing of waves in phase and out of phase.
Figure 4:
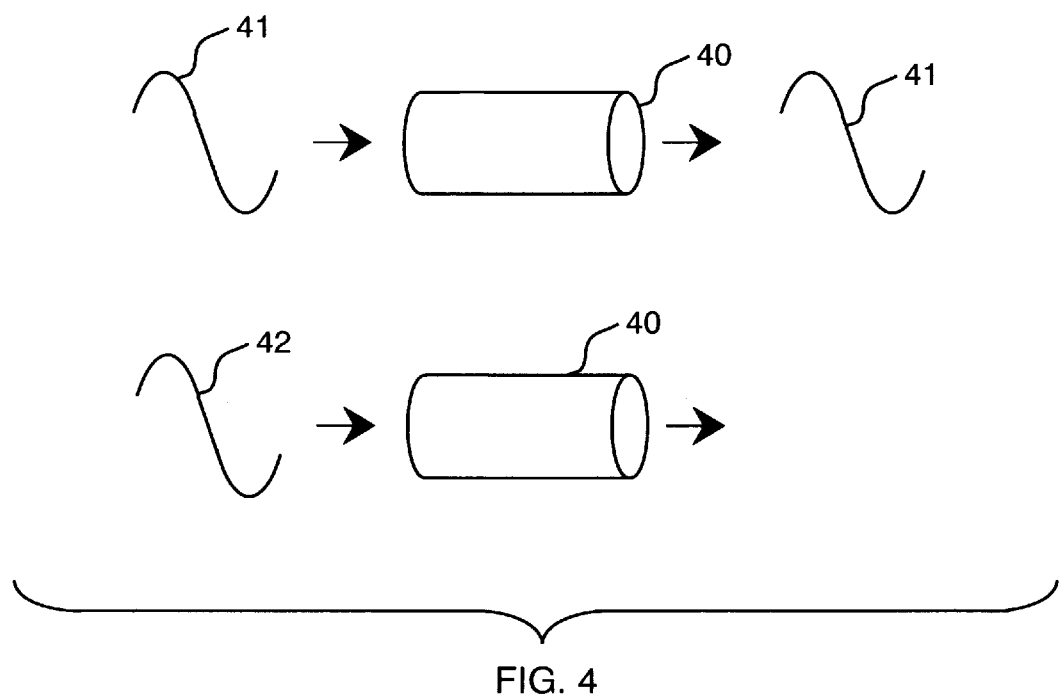
FIG. 4 is a diagrammatic illustration of the effect of a wave guide on waves of different wavelengths.
Figure 5:
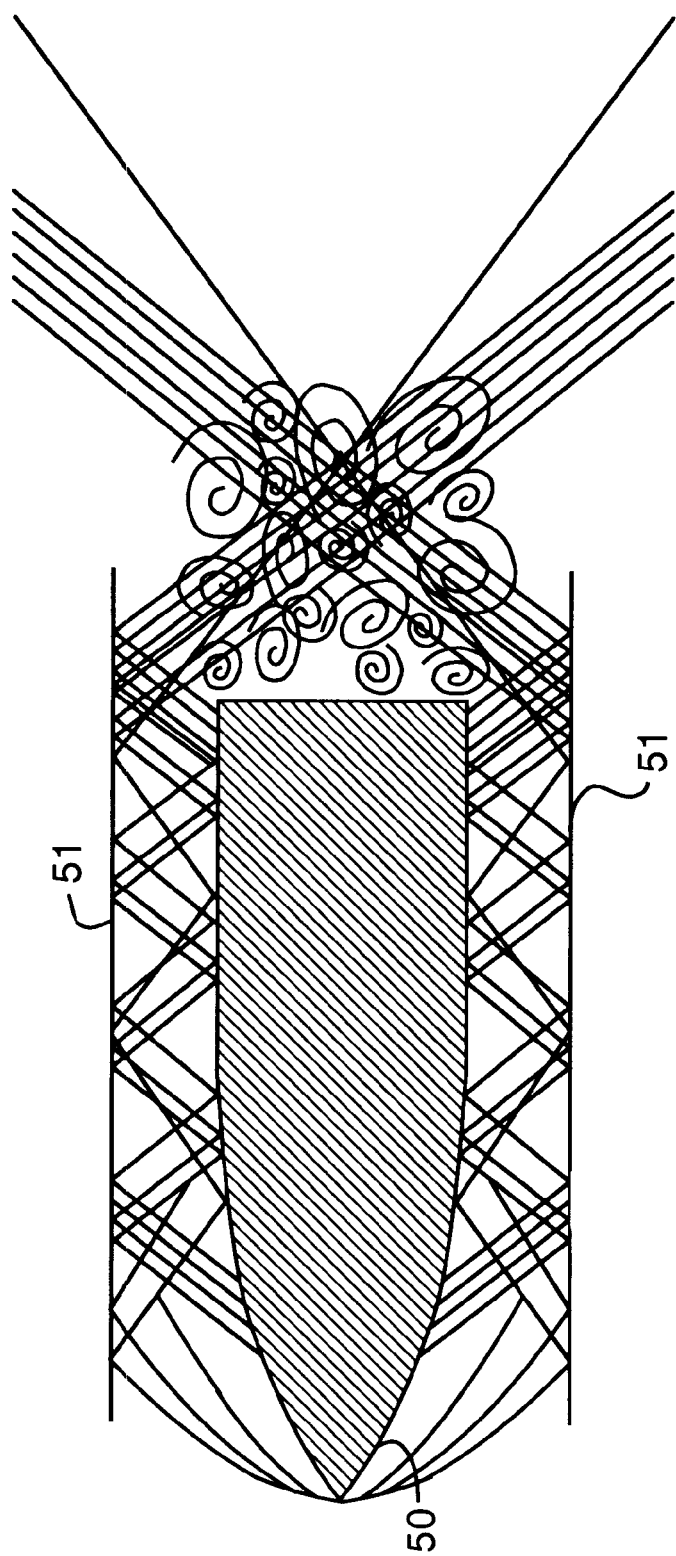
FIG. 5 is a diagrammatic top view of the wake effects of a basic embodiment of the invention.

Referring now to FIG. 5, rigid port and starboard plate systems 51 are adjustably attached to hull 50 on respective sides in approximately vertical planes parallel to the hull. The plate systems are supported at a height where they partially submerged, and set at a distance from the hull determined by actual use to cause the most attenuation of the displacement wake. The distance and height of the upper edge of the plates above the waterline will be determined by the size of the usual bow wave. The volume between the plate systems and the hull will have to be greater than the water displaced to be effective. Outriders 51 are set at a fixed distance from the hull of the vessel determined to maximize the attenuation of wake for the usual displacement, speed and surface conditions incurred by the subject vessel.

Figure 6:
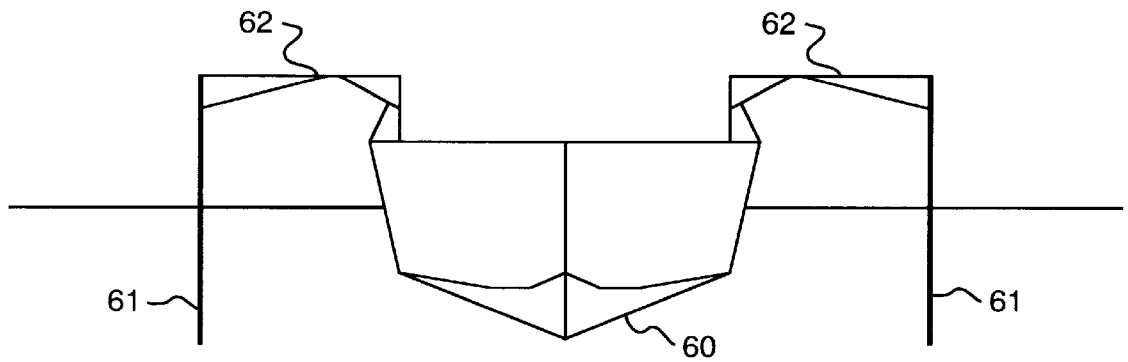
FIG. 6 is a front view of a hull with vertical reflector plates in the manner of FIG. 5.
Figure 6A:
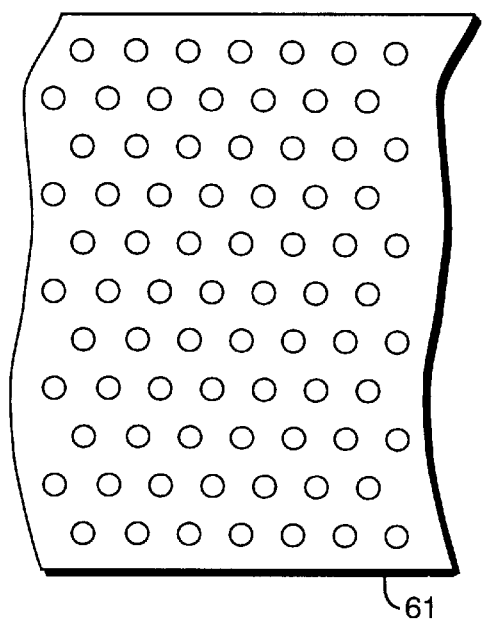
FIG. 6A is a side elevation of a perforated plate of FIG. 6.

Referring to FIG. 6, port and starboard plate systems 61 are configured from support structures 62 mounted on hull 60 of a surface ship. Support structure 62 may be retracted to bring plate systems 61 to a stowed position along the hull, and be deployed as shown when required.

The plates of plate system 61 may be perforated with a series of relatively small holes to dissipate some of the wave energy through the plate system in a distributed fashion. The plate systems otherwise attenuate and dissipate the displacement wake by reflecting the wave back against the hull.

Figure 7:
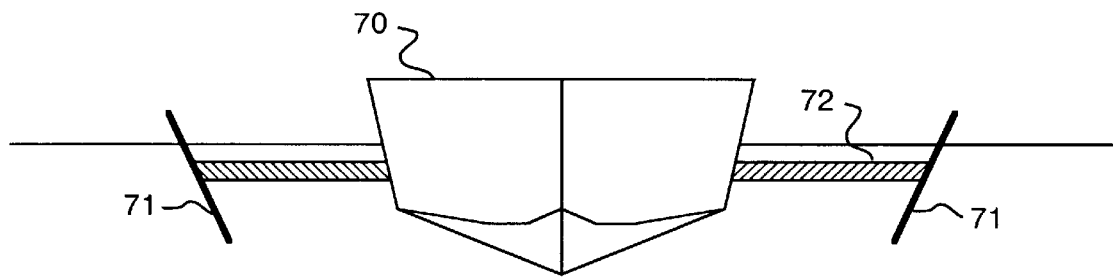
FIG. 7 is a front view of a hull with outwardly sloping reflector plates.

Referring to FIG. 7, plate systems 71 are supported on booms 72 projecting from hull 70 of a surface ship. Plate systems 71 are set at an outward sloping angle of about 30 degrees from the vertical to deflect a portion of the wake upward, further disrupting or dampening the impact of the wake and reducing the concentration of energy in the reflected wave.

Figure 8:
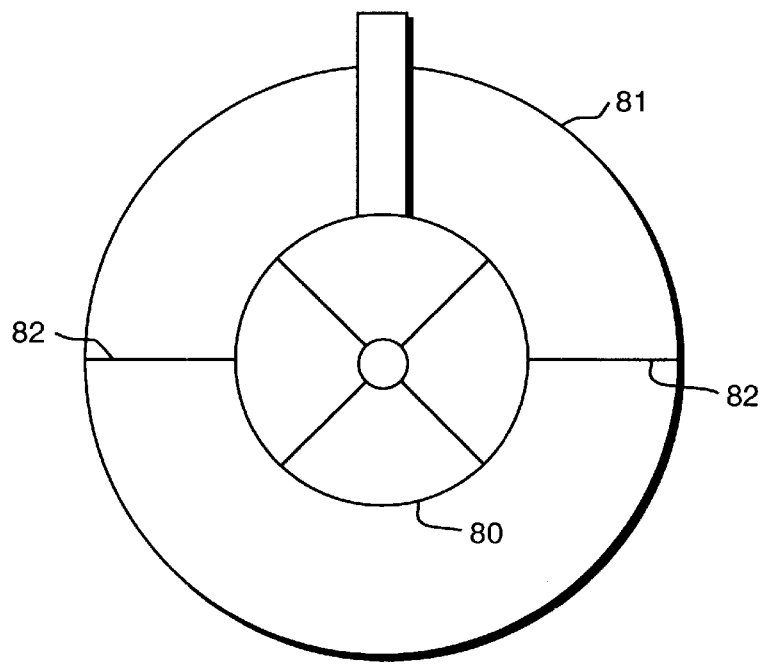
FIG. 8 is a front view of a fully encircling reflector system on a submersible vessel.

Referring to FIG. 8, submarine hull 80 is enclosed by a fully encircling reflector plate system 81 that is at least one half the length of the hull, and supported by booms 82 projecting outward from the hull. The distance of the plate system to the hull is determined by the displacement and maximum speed of the vessel.

Figure 9:
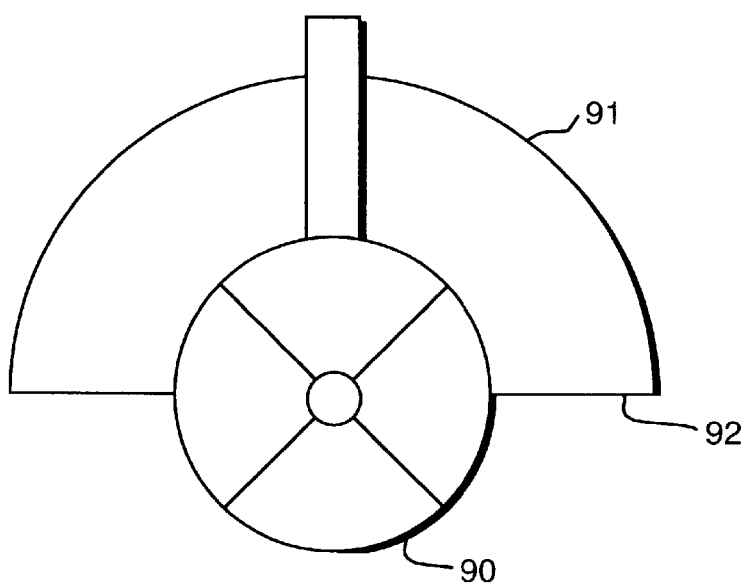
FIG. 9 is a front view of a top half encircling reflector system on a submersible vessel.
Figure 9A:
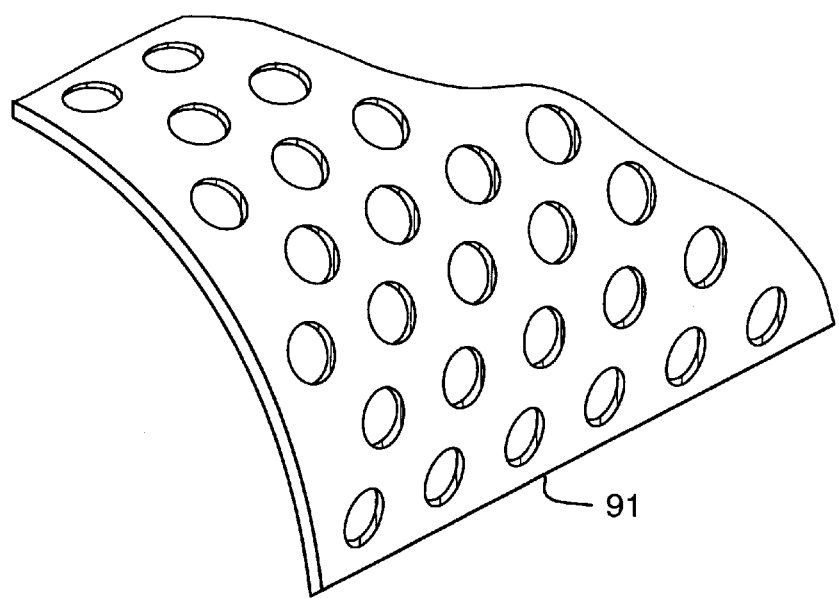
FIG. 9A is a partial perspective view of a perforated plate of FIG. 9.

Referring to FIG. 9, submarine hull 90 is topped by a semi encircling plate system 91 that is at least one half the length of the hull and spaced by booms 92. The distance of the plate system to the hull is determined by the displacement and maximum speed of the vessel.

Figure 10:
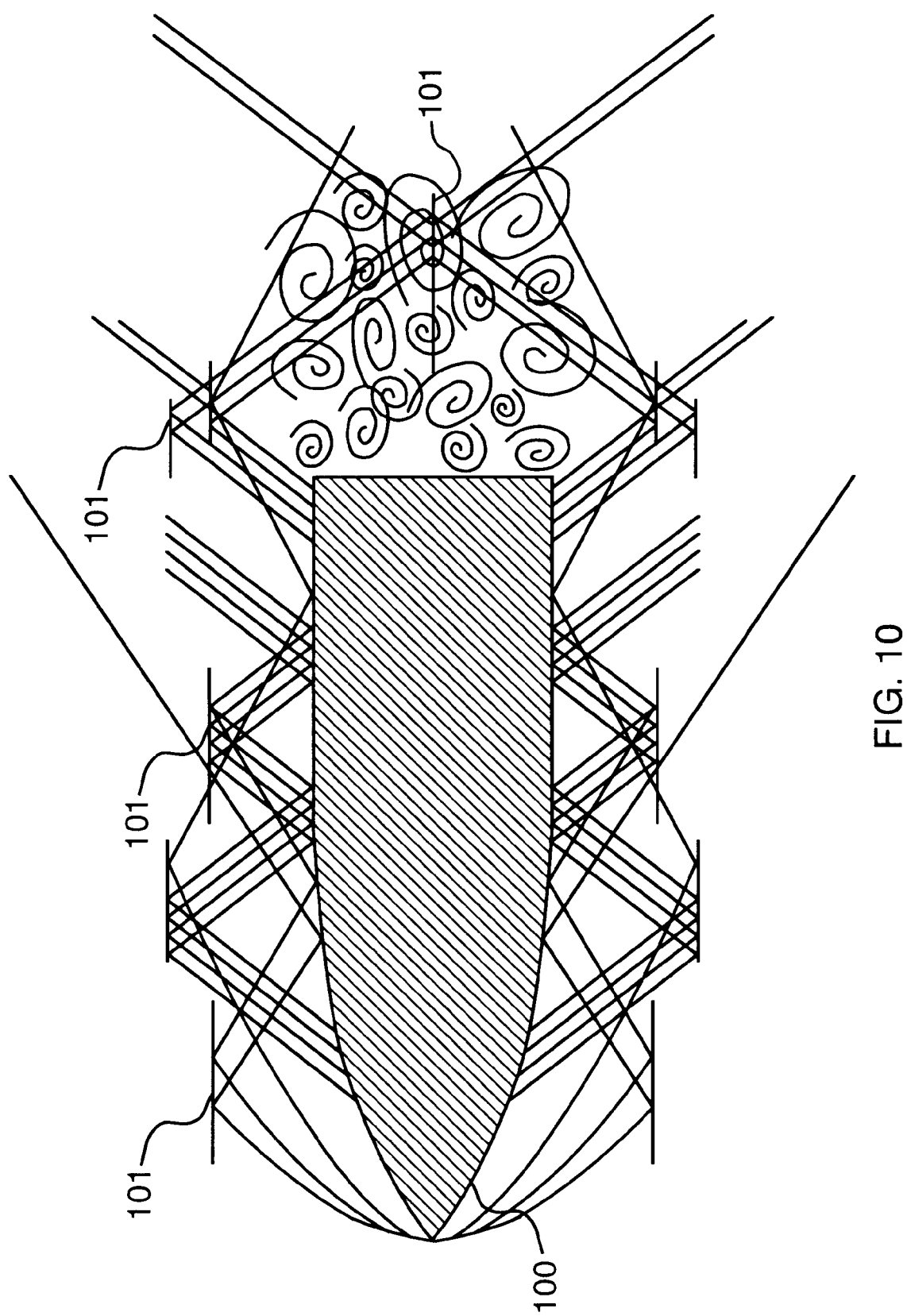
FIG. 10 is a diagrammatic top view of the wave effect of the hull of a surface vessel configured with staggered reflector plates.

Referring to FIG. 10, is a top view of a surface ship equipped with another embodiment of the invention. Hull 100 is configured with port and starboard side plate arrays 101, where adjacent plates are configured in alternate planes supported by structure projecting outward from the hull. As in other embodiments, individual plates are parallel to the direction of travel. The effect of the disjointed, non-planar surface of the plate system is to break up the displacement wake into a fragmented reflection of out-of-phase components, with some portion being leaked between the plates along the length of the system. The flow lines of the figure clearly depict the disruption, dampening, reflection and alteration to the primary wake components.

The above description is merely a preferred embodiment. To those skilled in the art, the invention admits of many variations. For example, a wake reflector system for attenuating the displacement wake of a moving marine vessels can be attached to and configured outboard of the hull and parallel to the primary direction of motion. For surface vessels, the wake reflector system may consist of port and starboard plate systems suspended outboard of the hull and parallel to the direction of motion. The plate systems may be suspended at a distance from the widest point of the hull of at least twice the width of the bow wave at maximum speed and displacement, and extend at least vertically from the surface upward and longitudinally from the bow to the widest point of the hull. The system may extend longitudinally from the bow to beyond the stern sufficiently far to reflect the surfacing propulsion wake.

As another example, the plate systems may be suspended at a distance from the widest point of the hull of at least twice the width of the bow wave at maximum speed and displacement, and extend vertically from keel depth to the top of the freeboard height and longitudinally from the bow to at least the widest point of the hull, or to beyond the stern sufficiently far to reflect the surfacing propulsion wake.

As further examples, the upper edges of the plate systems may be set at a greater distance than the lower edges outboard from the hull in a sloping manner. The plate systems may be constructed of multiple plates arranged in spaced plate arrays. The plates may have perforations. Plate arrays may have adjacent plates configured in alternate planes set at somewhat different distances from the hull.

As yet further examples, the system may be applied to a submarine or submergible vessel as a plate system suspended outboard of the hull and parallel to the direction of motion, generally conforming to and enclosing at least the upper half of the hull so as to affect at least the upper half of the bow wave, and extending longitudinally from the bow to at least the widest point of the hull, or further to the stem. The plate system design may be expanded to generally conform to and surround or enclose substantially all of the cross section shape of the hull, in the form of an open-ended tube like structure.

Other embodiments and examples of the invention will be apparent from the specification and figures to whose skilled in the art, all within the scope of the appended claims.

What is claimed is:

1. A wake reflector system for attenuating the displacement wake of a moving marine surface vessel comprising port and starboard plate systems suspended outboard of the hull and parallel to the direction of motion, said plate systems suspended at a distance from the widest point of the hull of at least twice the width of the bow wave at maximum speed and displacement and extending at least vertically from the surface upward and longitudinally from the bow to said widest point of the hull, and further comprising the upper edges of said plate systems configured at a greater distance than the lower edges from said hull.

2. The wake reflector system of claim 1, said plate systems comprising plate arrays.

3. The wake reflector system of claim 1, said plate systems comprising perforated plates.

4. The wake reflector system of claim 1, said plate systems comprising plate arrays with adjacent plates configured in alternate planes.

5. A wake reflector system for attenuating the displacement wake of a moving marine surface vessel comprising port and starboard plate systems suspended outboard of the hull and parallel to the direction of motion, said plate systems suspended at a distance from the widest point of the hull of at least twice the width of the bow wave at maximum speed and displacement and extending at least vertically from the surface upward and longitudinally from the bow to beyond the stern sufficiently far to reflect the surfacing propulsion wake, and further comprising the upper edges of said plate systems configured at a greater distance than the lower edges from said hull.

6. The wake reflector system of claim 5, said plate systems comprising plate arrays.

7. The wake reflector system of claim 5, said plate systems comprising perforated plates.

8. The wake reflector system of claim 5, said plate systems comprising plate arrays with adjacent plates configured in alternate planes.

9. A wake reflector system for attenuating the displacement wake of a moving marine surface vessel comprising port and starboard plate systems suspended outboard of the hull and parallel to the direction of motion, said plate systems suspended at a distance from the widest point of the hull of at least twice the width of the bow wave at maximum speed and displacement, and extending vertically from keel depth to the top of the freeboard height and longitudinally from the bow to at least said widest point of the hull, and further comprising the upper edges of said plate systems configured at a greater distance than the lower edges from said hull.

10. The wake reflector system of claim 9, said plate systems comprising plate arrays.

11. The wake reflector system of claim 9, said plate systems comprising perforated plates.

12. The wake reflector system of claim 9, said plate systems comprising plate arrays with adjacent plates configured in alternate planes.

13. A wake reflector system for attenuating the displacement wake of a moving marine surface vessel comprising port and starboard plate systems suspended outboard of the hull and parallel to the direction of motion, said plate systems suspended at a distance from the widest point of the hull of at least twice the width of the bow wave at maximum speed, and extending vertically from keel depth to the top of the freeboard height and longitudinally from the bow to beyond the stern sufficiently far to reflect the surfacing propulsion wake, and further comprising the upper edges of said plate systems configured at a greater distance than the lower edges from said hull.

14. The wake reflector system of claim 13, said plate systems comprising plate arrays.

15. The wake reflector system of claim 13, said plate systems comprising perforated plates.

16. The wake reflector system of claim 13, said plate systems comprising plate arrays with adjacent plates configured in alternate planes.

* * * * *